(12) United States Patent
Ferzli

(10) Patent No.: US 10,827,824 B1
(45) Date of Patent: Nov. 10, 2020

(54) PERSONAL CARE BRUSH WITH SINGLE DOSE DISPENSER

(71) Applicant: George S. Ferzli, Staten Island, NY (US)

(72) Inventor: George S. Ferzli, Staten Island, NY (US)

( * ) Notice: Subject to any disclaimer, the term of this patent is extended or adjusted under 35 U.S.C. 154(b) by 82 days.

(21) Appl. No.: 16/408,700

(22) Filed: May 10, 2019

(51) Int. Cl.
| A46B 11/04 | (2006.01) |
| A46B 11/00 | (2006.01) |
| A45D 27/04 | (2006.01) |
| A61C 17/22 | (2006.01) |

(52) U.S. Cl.
CPC .......... *A46B 11/0003* (2013.01); *A45D 27/04* (2013.01); *A61C 17/227* (2013.01); *A46B 2200/1033* (2013.01); *A46B 2200/1066* (2013.01)

(58) Field of Classification Search
CPC ........ A46B 11/0003; A46B 2200/1033; A46B 2200/1066; A61C 17/227
USPC ........................................................ 401/270
See application file for complete search history.

(56) References Cited

U.S. PATENT DOCUMENTS

| 4,066,367 A | 1/1978 | Sherosky |
| 4,427,116 A | 1/1984 | Brown |
| 4,786,199 A | 11/1988 | Chen |
| 6,002,523 A | 12/1999 | Nettlefold |
| 6,273,629 B1 | 8/2001 | Jordan |
| 7,074,390 B2 | 7/2006 | MacKinnon |
| 7,896,567 B2 | 3/2011 | Burrowes |
| 8,109,686 B2 * | 2/2012 | Bartschi ............. A46B 15/0091 401/282 |
| 8,235,619 B2 | 8/2012 | Meredith |
| 8,425,133 B2 * | 4/2013 | Grez ....................... A61C 17/22 401/123 |
| 8,496,393 B2 | 7/2013 | Martin |
| 8,550,739 B1 | 10/2013 | Robbins |
| 8,794,249 B2 | 8/2014 | Gerber |
| 8,864,402 B2 | 10/2014 | Vila |
| 8,881,332 B2 | 11/2014 | Noble |
| 9,022,680 B1 | 5/2015 | Lubyabitskiy |
| 9,474,360 B2 | 10/2016 | Alsalameh |
| 9,510,664 B2 | 12/2016 | Wen |
| 9,826,823 B1 | 11/2017 | Velazquez |
| 10,154,728 B2 | 12/2018 | Hailechristos |
| 10,159,332 B2 | 12/2018 | Moskovich |
| 10,213,012 B2 | 2/2019 | Jimenez |
| 10,687,612 B2 * | 6/2020 | Beck .................. A46B 15/0085 |
| 2009/0052977 A1 * | 2/2009 | DellaCorte ........ A46B 11/0003 401/291 |

FOREIGN PATENT DOCUMENTS

KR          101375548 B1 *   3/2014

* cited by examiner

*Primary Examiner* — Jennifer C Chiang
(74) *Attorney, Agent, or Firm* — Jordan and Koda, PLLC

(57) ABSTRACT

A personal care instrument, such as a toothbrush or shave brush, has a single dose capsule of dentrifice or shaving substance that is opened and dispensed. The capsule is loaded into a chamber in a hollow of the instrument. An advancing device advances the capsule into the head of the instrument. A barrier facilitates opening of the capsule. Continued advancement collapses the capsule forcing the contents to be released through an opening in the head to the brush elements so as to dispense the single dose. The instrument also may contain a storage compartment for storing multiple capsules.

19 Claims, 7 Drawing Sheets

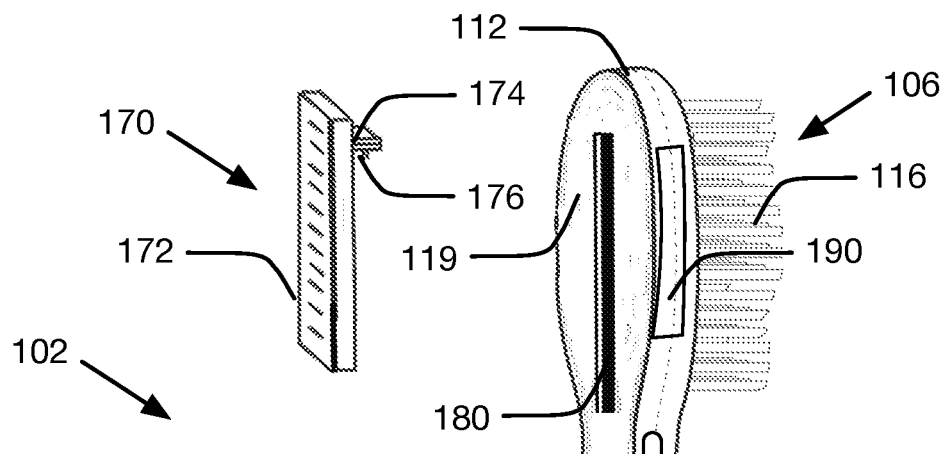
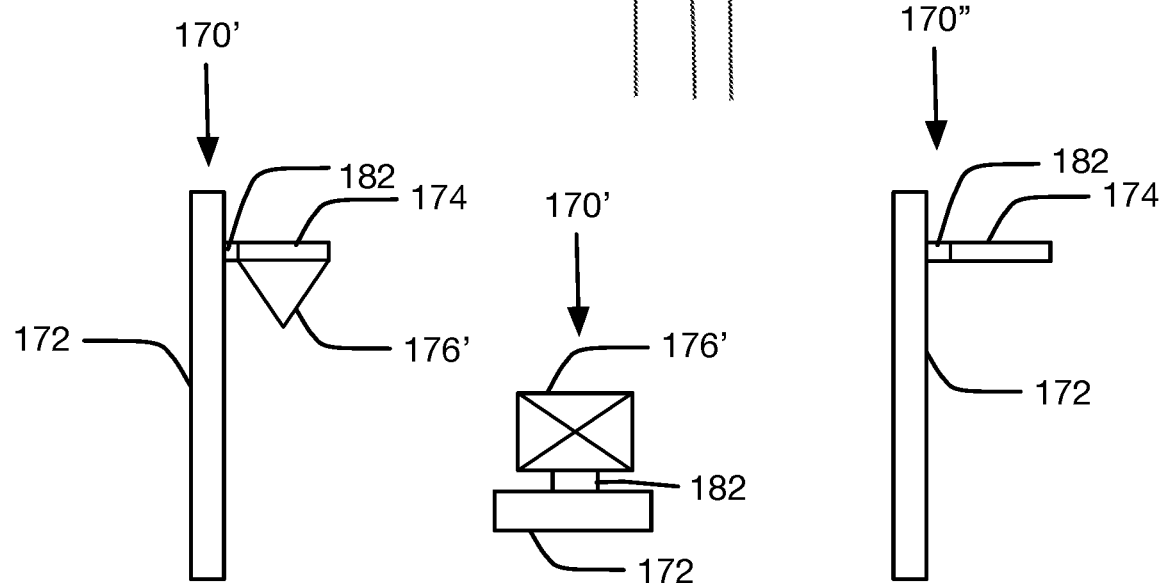
FIG. 6    FIG. 7A    FIG. 7B    FIG. 8

PERSONAL CARE BRUSH WITH SINGLE DOSE DISPENSER

BACKGROUND OF THE INVENTION

This invention generally relates to oral care and facial care instruments, and more particularly to oral care toothbrushes and facial care shave brushes having built-in care product dispensing capability.

Toothbrushing generally involves squeezing dentifrice onto a toothbrush head prior to brushing. It is known that greater convenience can be achieved by providing a tooth brush having a built in reservoir from which the dentifrice is dispensed during brushing. Despite the appeal of such a dispensing, reservoir-filled toothbrush, and the many designs for them that have been suggested in patent literature over the past several decades, such category of toothbrush product has not become commercially popular with consumers. Some designs render the toothbrush system too costly by including electric drive train components. Other designs are less reliable and unnecessarily difficult for children to use, such as by including a bulky piston and screw design for collapsing the reservoir. Other designs render the toothbrush system too unsanitary, if not properly cleaned.

Other than convenience and ease of use, another challenge of dispensing-type toothbrushes is that of reliably transporting the dentifrice from a built-in reservoir to the toothbrush head. Typically the dentifrice has to be squeezed from a reservoir through a relatively long (compared to the neck of a toothpaste tube) but narrow conduit whose dimensions are constrained by the toothbrush neck.

The present invention relates a toothbrush that overcomes the shortcomings and inconveniences of prior toothbrush configurations described above.

Shaving with a razor, shave brush and shaving soap typically requires the user to apply a wet shave brush to a cup containing the shaving soap so as to lather the shaving soap onto the brush bristles. The lathered soap then is applied to the face using the shave brush. Although this is a popular method of shaving, a shave cup is inconvenient for travellers.

Other shave brushes configured as a housing for a shaving can/reservoir and dispense the shaving foam through the brush head to the brush bristles.

The present invention relates to a shave brush, that improve the convenience of a shave brushes.

SUMMARY OF THE INVENTION

The oral and facial care instruments of this invention provide single dose dispensing of the dentifrice or shaving cream to brush bristles from an underside of the bristles. In particular a capsule holding a single dose is opened and collapsed to dispense the contents to the brush bristles for application to the user.

A brush head from which brush bristles extend has a first opening at a base of the brush bristles. An elongated body, including a handle portion, is hollow having an inner channel forming a storage chamber and a loading chamber. The loading chamber receives the single-dose capsule through an opening in the elongated body. An advancing mechanism, such as roller or piston located within the loading chamber, is movable to advance the single-dose capsule from the loading chamber toward the brush head. A slider grip portion of the advancing mechanism is located external to the elongated body and is connected to the roller/piston. The user moves the slider grip along a track in the elongated member toward the brush head to advance the capsule. A barrier device for facilitating opening and collapsing of the capsule is located along the pathway of the single-dose capsule to puncture or otherwise assist in opening the capsule and forcing the contents from the capsule. The capsule contents are forced through the opening at the base of the bristles, so as to be applied to the brush head bristles. The brush then is used to perform toothbrushing or for applying shaving cream, as per the embodiment.

Of particular significance is that the capsule is compressed and collapsed under a direct force supplied only by the user at either one or both sliding grips proximal and distal to the capsule as loaded in the loading chamber. There is no screw turning mechanism nor a gear train needed to transfer sufficient force to compress the capsule. There is no direct contact needed by the user against the capsule to supply the force for compression. Further, a barrier, such as a protrusion having a pointed end, an inclined end, or anvil-like end facilitates puncturing of the capsule either before or during the compression and collapsing of the capsule.

BRIEF DESCRIPTION OF THE DRAWINGS

FIG. 6 is an exploded perspective view of the upper portion of the toothbrush of FIG. 1, in accordance with an embodiment of the present invention.

FIG. 7A is a schematic side view of a movable barrier structure for puncturing a dentifrice capsule loaded within the loading chamber of a toothbrush, in accordance with another embodiment of the present invention.

FIG. 7B, is a schematic view of the movable barrier structure for puncturing a dentifrice capsule loaded within the loading chamber of the toothbrush of FIG. 7A, viewed from proximally as extending along the toothbrush longitudinal axis, in accordance with an embodiment of the present invention.

FIG. 8 is a schematic side view of another embodiment of a movable barrier structure for collapsing a dentifrice capsule loaded within the loading chamber, in accordance with an embodiment of the present invention.

DETAILED DESCRIPTION OF THE PREFERRED EMBODIMENTS

In the following description, for purposes of explanation and not limitation, specific details may be set forth to provide a thorough understanding of the present invention. However, it will be apparent to one skilled in the art that the present invention may be practiced in other embodiments that depart from these specific details. Detailed descriptions of well-known components are omitted so as not to obscure the description of the present invention.

Toothbrush Embodiments

Figure 1:
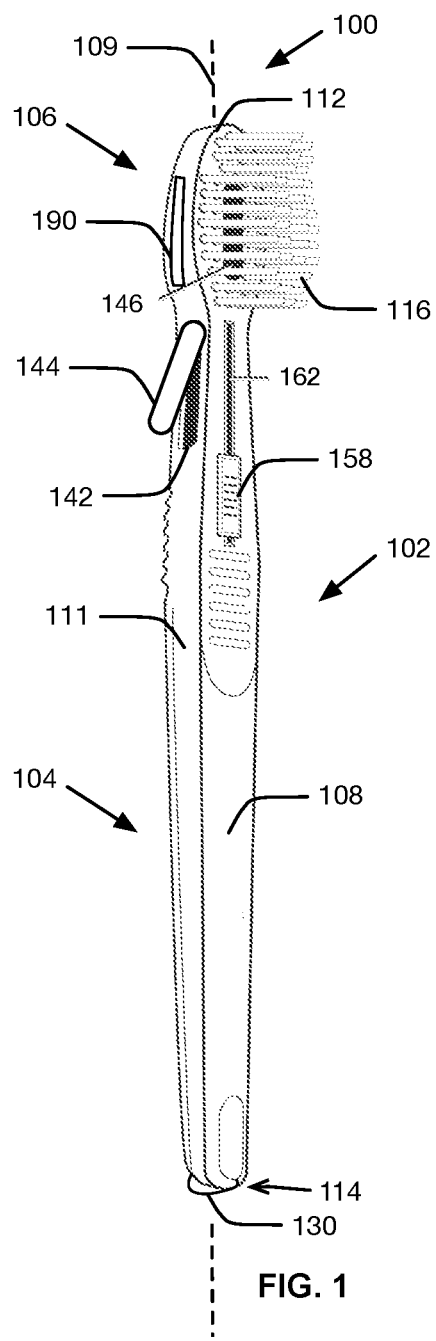
FIG. 1 is a perspective view of a toothbrush having a single dose dispensing capability, in accordance with an embodiment of the present invention
Figure 2:
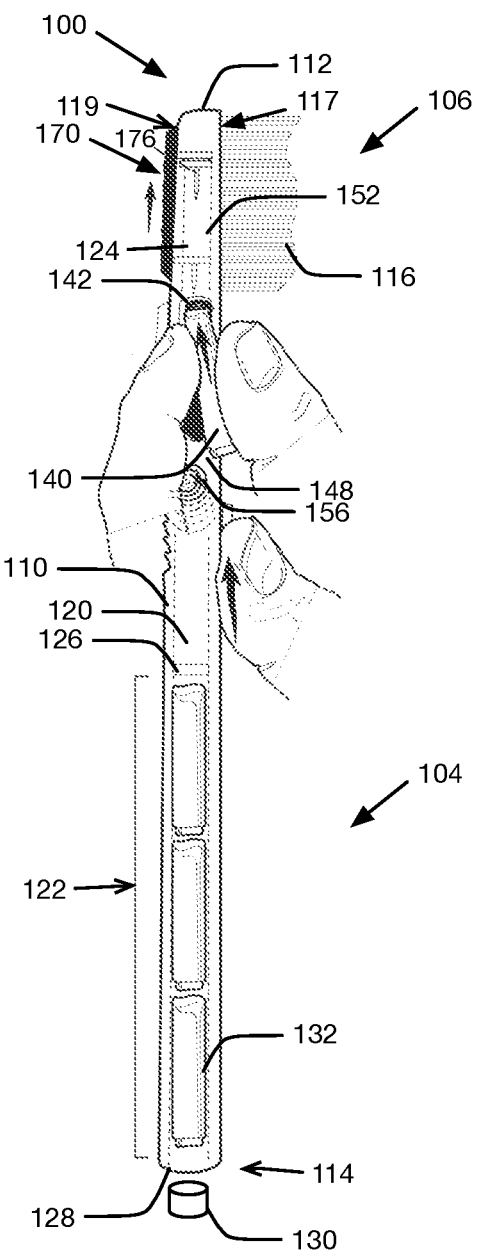
FIG. 2 is a side view of the toothbrush of FIG. 1 with a pin at the upper portion of the loading chamber revealed and with dentifrice capsules stored in the storage chamber revealed.

Referring to FIGS. 1 and 2, a toothbrush 100 is illustrated in accordance with an embodiment of the present invention. The toothbrush 100 generally includes an elongated body 102 having a handle portion 104 and a head portion 106. Tooth cleaning elements 116 (e.g., bristles) extend from the head portion 106. The toothbrush 100 is intended to be used in a manner that the tooth cleaning elements 116 clean a user's teeth. Although the illustrated toothbrush 100 is in the form of a manual toothbrush, in other embodiments the toothbrush 100 may be a powered toothbrush.

The body 102 of the toothbrush 100 generally extends along a longitudinal axis 109 from a proximal end 114 to a distal end 112. Because the body 102 may, in certain embodiments, be a non-linear structure, the longitudinal axis of the body 102 may also be non-linear in certain embodiments. However, the invention is not to be so limited in all embodiments, and in certain other embodiments the body 102 may have a simple linear arrangement and thus a substantially linear longitudinal axis.

The handle portion 104 of the toothbrush 100 is an elongated structure extending from the proximal end 114 to the toothbrush head portion 106. The handle portion 104 provides the mechanism by which the user can hold and manipulate the toothbrush 100 during use. The handle portion 104 includes an outer surface that includes a front surface 108 and an opposing rear surface 110. In the exemplified embodiment, the handle portion 104 is generically depicted as being straight. However, in other embodiments the handle portion 104 may have contours for user comfort.

In the exemplified embodiment, the handle portion 104 is formed of a rigid plastic material, for example polymers and copolymers of ethylene, propylene, butadiene, vinyl compounds and polyesters such as polyethylene terephthalate. In other embodiments the handle portion 104 can be formed of any material that is not incompatible with the dentrifice that is stored therein. The handle portion 104 also may include a resilient material, such as a thermoplastic elastomer, as a grip cover that is molded over portions of or the entirety of the handle portion 104 to enhance gripping of the handle portion 104 during use. For example, portions of the handle portion 104 that are typically gripped by a user's palm during use may include a thermoplastic elastomer or other resilient material to further increase user comfort.

The head portion 106 of the toothbrush 100 is coupled to the handle portion 104 and includes a front surface 117 and an opposing rear surface 119. In the exemplified embodiment, the head portion 106 is formed integrally with the handle portion 104 as a single unitary structure using a molding, milling, machining or other suitable process. However, in other embodiments the handle portion 104 and the head portion 106 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. Typically, the head portion 106 is formed by any of the materials described above for the handle portion 104.

The head portion 106 of the toothbrush 100 has a plurality of tooth cleaning elements 116 (e.g., bristles) extending from the front surface 117. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the elastomeric material of the tooth or soft tissue engaging elements has a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 116 are connected to the head portion 106 in any manner known in the art. For example, staples/anchors, in-mold tufting (IMT) or anchor free tufting (AFT) could be used to mount the cleaning elements/tooth engaging elements to the head portion 106. In AFT, a plate or membrane having tuft holes therein is formed separately from the body 102 of the toothbrush 100. Bristles or other tooth cleaning elements are positioned within the tuft holes. The free ends of the bristles on one side of the plate or membrane perform the cleaning function. The ends of the bristles on the other side of the plate or membrane are melted together by heat to be anchored in place. After the bristles are properly coupled to the head plate, the head plate is secured to the brush head such as by ultrasonic welding.

Storage and Loading Chambers

In an exemplary embodiment the toothbrush 100 is hollow having an inner cavity 120 extending from an opening 128 at the proximal end 114 to a closed end in the head portion 106 toward the distal end 112 of the toothbrush 100. In such embodiment the inner cavity 120 is divided into a storage chamber 122 and a loading chamber 124. A divider or barrier 126 is located in the cavity 120 to separate the storage chamber 122 from the loading chamber 124. The barrier 126 may be a separate piece inserted into the cavity 120, or may be an integral portion of the unitary structure forming the toothbrush body 102 or handle portion 104.

The storage chamber 122 serves to store a plurality of single dose dentifrice capsules 132, such as in a line along the longitudinal axis. The dentifrice capsules 132 are inserted through the opening 128 into the chamber 122 for storage. The opening 128 is closed by a closing structure 130. Illustrated is a plug that mates with the opening 128 to close the cavity 120 so as to prevent any stored capsules 132 from falling out of the toothbrush 100. The plug may be made of an elastomer or other material adapted to withstand repeated insertion and removal. In some embodiments the plug may be made of a rigid material and be threaded to screw into an opening 128 having corresponding threads. In still other embodiments the closing structure 130 may be a hinged door formed as part of the handle portion 104 and that clicks into and out of a locking position.

The loading chamber 124 is located more distal than the storage chamber 122 and extends from the handle portion 104 into the head portion 106. Along a side surface 111 of the handle portion 104 is an opening 142. In some embodiments the opening 142 has no cover so as to remain open at all times. In other embodiments the opening 142 is closed by a cover 144, such as a hinged door or a separate detachable cover piece. A single dentifrice capsule 140 is inserted through the opening 142 into a lower portion 148 of the loading chamber 124 along the handle portion 104. The dentifrice capsule 140 is moved within the loading chamber 124 to the head portion 106, then collapsed to release the dentifrice from within the capsule 140. The head portion 106 includes an opening 146 at the front surface 117 among the tooth cleaning elements 116. When the capsule 140 is collapsed, the dentifrice 150 exits through the opening 146 to the tooth cleaning elements 116. (See FIGS. 1 and 3.) The loading process and related structures are described in more detail below.

Single Dose Loading Features

Figure 3:
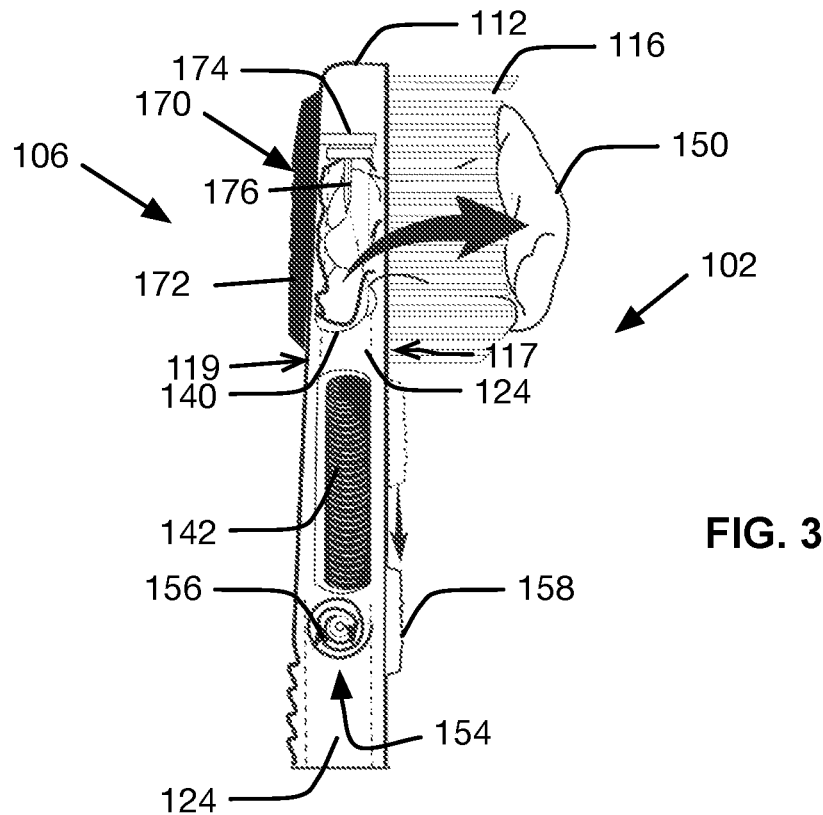
FIG. 3 is a side view of the upper portion of the toothbrush brush of FIG. 1 feature with the pin and crushed dentifrice capsule at the upper portion of the loading chamber revealed, and the roller at the lower portion of the loading chamber revealed.

Referring to FIG. 3, an upper portion of the toothbrush body 102 is illustrated, with the upper portion of the loading chamber 124 revealed to show a collapsed capsule 140 therein, along with a sharp pointed protrusion for perforating the outer wall material of the capsule 140. The remainder of the loading chamber 124 and inner cavity 120 are shown in phantom view.

Figure 4A:
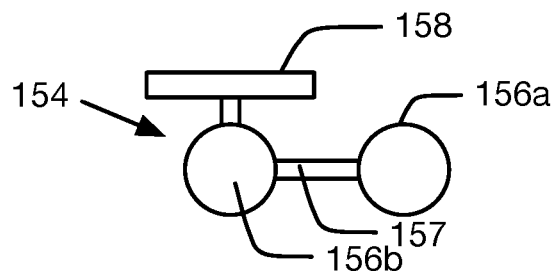
FIG. 4A is a schematic side view of the advancing mechanism of the toothbrush of FIG. 1, in accordance with an embodiment of the present invention.
Figure 4B:
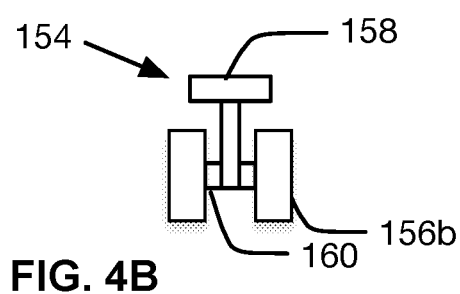
FIG. 4B is a schematic view of the advancing mechanism of FIG. 4A, viewed from proximally as extending along the toothbrush longitudinal axis, in accordance with an embodiment of the present invention.

In an exemplary embodiment, the toothbrush 100 includes an advancing mechanism 154 that moves the loaded capsule 140 from a lower portion 148 of the loading chamber 124 to a more distal upper portion 152 (see FIG. 2) of the loading chamber 124 in the head portion 106. Referring to FIGS. 3, 4A, and 4B, an embodiment of the advancing mechanism 154 includes one or more roller sets 156 (e.g., 156a,b) and a slider grip 158. The rollers rotate about an axis defined by an axle 160. The slider grip 158 is coupled to the axle 160 by a frame 157 to move the entire advancing mechanism 154 longitudinally within the loading chamber 124. A user places their finger on the slider grip 158 and pushes the slider grip 158 along a track 162 (see FIG. 1) to advance the advancing mechanism 154 longitudinally. During longitudinal movement the rollers 156 roll within the loading chamber 124. FIGS. 1 and 3 show the advancing mechanism 154 in an initial retracted position. FIG. 3 also shows in phantom the slider grip 158 for when the advancing mechanism 154 is advanced distally to move the capsule 140 to a position behind the brush cleaning elements 116 in the toothbrush head 106. Longitudinal motion of the advancing mechanism 154 in FIG. 4A is to the left and right in the plane of the drawing sheet. Longitudinal motion of the advancing mechanism 154 in FIG. 4B is into and out of the plane of the drawing sheet. In the illustrated embodiment the frame 157 positions the rollers 156 more distal than the sliding grip 158, so as to allow the advancing mechanism to advance the capsule 140 into the head portion 106 and collapse the capsule 140. The relative location of the rollers 156 and siding grip 158 along the longitudinal axis 109 will vary according to the embodiment so as to be able to collapse the capsule 140 between the rollers 156 and a distal barrier structure 174.

Figure 5A:
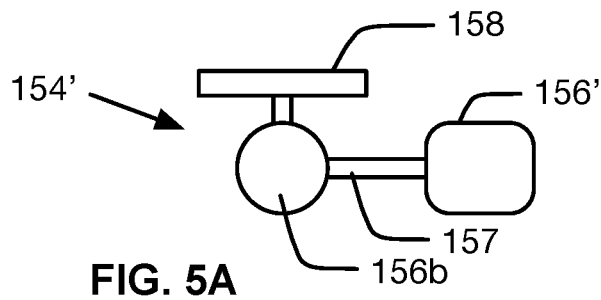
FIG. 5A is a schematic side view of the advancing mechanism of the toothbrush of FIG. 1, in accordance with another embodiment of the present invention.
Figure 5B:
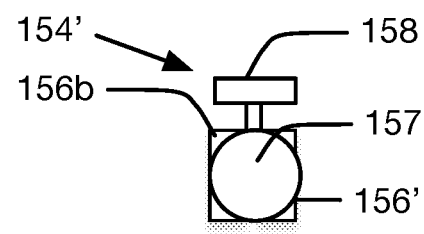
FIG. 5B is a schematic view of the advancing mechanism of FIG. 5A, viewed from proximally as extending along the toothbrush longitudinal axis, in accordance with another embodiment of the present invention.

Referring to FIGS. 5A and 5B, in an alternative embodiment the advancing mechanism 154' includes a piston 156' coupled to the slider grip 158, in addition to rollers 156b and an axle. The piston 156' moves within the inner cavity 120, and more specifically within the loading chamber 124 along the same path as for the roller embodiment. Longitudinal motion of the advancing mechanism 154' in FIG. 5A is to the left and right in the plane of the drawing sheet. Longitudinal motion of the advancing mechanism 154' in FIG. 5B is into and out of the plane of the drawing sheet. In the illustrated embodiment the frame 157 positions the piston 156' more distal than the sliding grip 158, so as to allow the advancing mechanism to advance the capsule 140 into the head portion 10 and collapse the capsule 140. The relative location of the piston 156' and the siding grip 158 along the longitudinal axis 109 will vary according to the embodiment so as to be able to collapse the capsule 140 between the piston 156' and a distal barrier structure 174.

Referring to FIG. 6, an upper portion of the toothbrush body 102 is illustrated, with a movable barrier mechanism 170 shown uninstalled from the head portion 106. The movable barrier mechanism 170 includes a slider grip 172 portion and the barrier structure 174 portion. The barrier structure protrudes from an underside of the slider grip 172 at or towards a distal end of the slider grip 172. In various embodiments, the barrier structure 174 has a generally pointed structure 176 mounted to or formed as part of the barrier structure 174. Although FIGS. 2, 3, and 6 illustrate the pointed structure 176 as being a pin-like structure, in other embodiment the pointed structure may vary to be conical, pyramid-shaped, wedge shaped, or another pointed or anvil-like shape to aid in puncturing the capsule 140. For example, a point (e.g., as for a pin or cone) or a pointed edge (e.g., as for a wedge) may be formed. Alternatively, the pin-like tip may instead be blunted, or be a blunt face. FIGS. 7A and 7B depict a movable barrier mechanism 170' having a barrier portion 174' with a pyramid-shaped structure 176'. In still other embodiments, the barrier portion 174 need not have a pointed structure, but instead may be blunted or have a flat face, such as shown for barrier portion 174 of the movable barrier mechanism 170" of FIG. 8.

Referring to FIG. 6, any of the various embodiments of the movable barrier mechanism 170 (or 170', 170") slide along a track opening 180 at the rear face 119 of the toothbrush head portion 106. The various embodiments of the movable barrier mechanism include a rail 182 (see FIGS. 7A, 7B and 8) which runs within the track opening 180. The slider grip 172 and the barrier structure 174 are wider than the rail 182 so as to keep the rail 182 in the track opening 180. In some embodiments, the track opening 180 has a wider portion (not shown) at either a distal or proximal end of the opening 180 so as to allow for removal and or re-installation of the movable barrier mechanism 170.

In an exemplary embodiment, the slider grip 172 has a longitudinal length greater than or approximating the longitudinal length of the track opening 180. By having such a length, the slider grip portion 172 covers the track opening 180 while the slider grip portion 172 is at its most distal position toward the distal end 112 of the toothbrush 100. Also, the roller 156 and piston 156' have an outer dimension that generally conforms to cross section of the inner channel 220 so as to prevent or limit dentrifice from passing proximally beyond the advancing member 254 when the single dose capsule 150 is collapsed between the advancing member 254 and the barrier structure 274.

Toothbrush Loading, Usage, and Cleaning

Referring to FIGS. 1-3, the loading and usage of the toothbrush 100 is now described. To use a capsule stored in the toothbrush, the user removes the closing structure 130 (e.g., plug) from the proximal end 114 of the toothbrush 100 and removes a capsule from among capsules 132 stored in the storage chamber 122. The closing structure 130 then is re-inserted to close the storage chamber 122.

To load the capsule into the loading chamber 124 for usage, the door 144 in the side of the toothbrush body 102 is opened (or in another embodiment a cover (in place of the door 144) is removed.) In some embodiments, there is no covering to the opening 142 to the loading chamber 124, so that the opening 142 is always exposed and the loading chamber therein is always accessible. The capsule 140 is loaded through the opening 142 into the loading chamber 124, while the advancing mechanism 154 is in the retracted proximal position shown in FIGS. 1 and 2). Accordingly, the capsule 140 is positioned in the loading chamber distal to the roller 156 (or piston 156'.)

The user then places their finger on the slider grip 172 of the movable barrier mechanism 170 and moves the barrier mechanism 170 proximally toward the handle portion 104 of the toothbrush 100, until the proximal end of the track opening 180 is reached, or until further proximal movement is blocked by the capsule 140. In some embodiments, after the barrier mechanism 170 makes contact with the capsule 140, the user continues to move the barrier mechanism 170 so as to puncture the capsule 140 with the generally pointed structure 176 or other structure, as per the embodiment.

Next, the user moves the capsule 140 distally into the head portion 106, by placing their finger on the slider grip 158 of the advancing mechanism 154 and advancing the slider grip 158 in the distal direction. The rollers 156 or piston 156' abut the capsule 140 and are part of the advancing mechanism 154. Accordingly, as the slider grip 158 is moved distally the roller or piston moves the capsule 140 into the toothbrush head portion 106 behind the tooth cleaning elements 116. As the user moves the slider grip 158 of the advancing mechanism 154, the barrier mechanism 170 in contact with the capsule 140 also is moved distally under the force communicated through the advancing mechanism 154 and capsule 140. In particular, the slider grip 158 moves distally within track 162 by the user's finger. Correspondingly, the rail 182 of the movable barrier mechanism 170 moves distally along track opening 180 by force conveyed through the advancing mechanism 154 and capsule 140. Before the slider grip 158 reaches the distal end of slider track 162, the barrier mechanism 170 reaches the distal end of its path. In particular, the barrier mechanism can move no further in the distal direction. Therefore, when the user continues pushing the slider grip 158 of the advancing mechanism 170 further in the distal direction, the capsule 140 is collapsed between the roller(s) 156 (or piston 156') and the barrier portion 174 (or more specifically, the pointed structure 176/176', if present, of the barrier portion 174.) The dentrifice 150 within the capsule 140 is thereby squeezed out of the capsule 140 as the capsule is collapsed under the force exerted by the user in the distal direction at the slider grip 158. Because the volume the capsule 140 occupies is closed (i) by the slider grip 172 of the barrier mechanism 170 at the rear surface 119 of the head portion 106, (ii) by the roller 156 or piston 156' at the proximal end of the capsule, and (ii) by the barrier structure 174 at the distal end of the capsule, (iv) the dentrifice is forced out the opening 146 at the front face 117 of the toothbrush head portion 106 at the base of the teeth cleaning elements 116. The dentrifice is forced out to be among the tooth cleaning elements.

With the dentrifice now among the teeth cleaning elements 116, the user can brush their teeth using the toothbrush 100 and the single dose of dentrifice 150 forced from the capsule 140.

To unload the collapsed capsule 140, the barrier mechanism 170 and advancing mechanism 154 are moved back in the proximal direction so that the collapsed capsule 140 is moved from the upper portion of the loading chamber back toward or into the lower portion of the loading chamber 124. For example, the user may place their finger on the slider grip 172 of the barrier mechanism 170 and slide proximally so that the rail 182 moves proximally in the track opening 180. The force applied in the proximal direction at the slider grip 172 is communicated through the capsule 140 to the rollers 156 or piston 156' thereby moving the advancing mechanism backwards. Thereby, the slider grip 158 of the advancing mechanism also is moved back toward its starting position. The slider grip 158 then may be moved further in the proximal direction to reach its initial starting position for loading capsules. Alternatively, instead of forcing the slider grip 172, the slider grip 158 of the advancing mechanism 154 may be moved by the user proximally along track 162. The collapsed capsule 140 is removed through the opening 142 once the capsule has been moved proximally enough for the user to grip and remove the collapsed capsule. The user also can simply shake the toothbrush 100 to force the collapsed capsule 140 out of the opening 142 once the capsules been moved back to the lower portion 148 of the loading chamber 124. Of course, any combination of the above movements can be used to remove the collapsed capsule 140.

Figure 9:
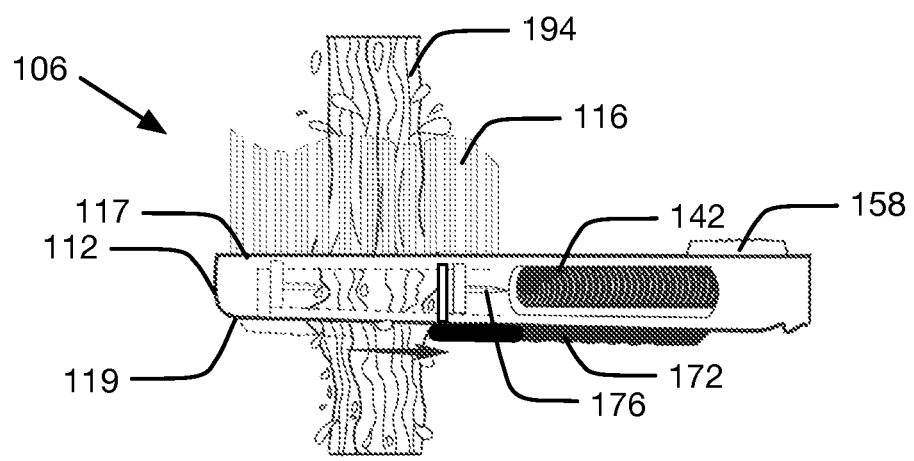
FIG. 9 is a partial view of the upper portion of the toothbrush of FIG. 1 configured for being washed (without the side door), in accordance with an embodiment of the present invention.
Figure 10:
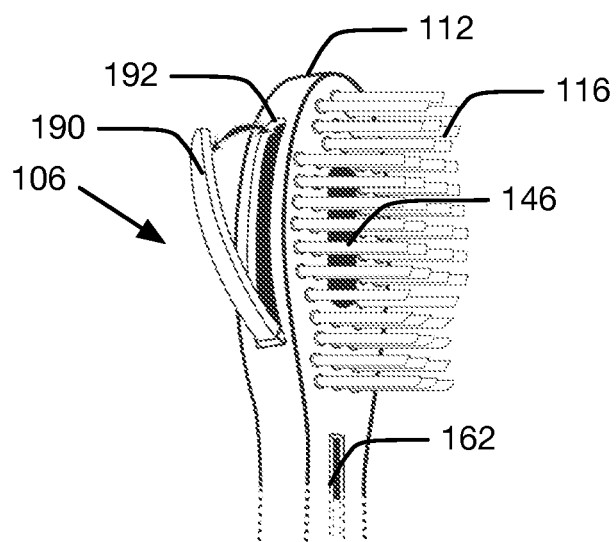
FIG. 10 is a perspective view of the top portion of a toothbrush having a side door for facilitating washing of the toothbrush interior, in accordance with an embodiment of the present invention.

Although dentrifice is driven from the capsule 140 through the opening 146 to the tooth cleaning elements 116 when collapsing the capsule 140, there may be residual dentrifice left in the loading chamber 124. The user may run water through the opening 146 and the track 180 to clean the upper portion of the loading chamber 124, such as shown in FIG. 9. In some embodiments, such as shown in FIG. 10, the toothbrush 100 includes a door 190 at a side surface of the toothbrush head portion 106. The door 190, for example, is hinged, and may be moved into and out of an open position. The door, for example, clicks into a closed position to remain securely closed. A grip on the door 190 or separation at the door enclosure allows a user to move the door 190 out of the clicked engaged position using a fingernail or instrument. With the door 190 open, the user runs water over the brush head portion 106 so as to clean the tooth cleaning elements 116. Water 194 also may be directed through the opening 146 in the head portion 106 to access the loading chamber 124. The water 194 flows out the opening 192 left by the open door 190. Further, by positioning the barrier mechanism 170 at its most distal position, water also flows out through the openings 162 and/or 142 to clean the lower portion of the loading chamber 124. Of course the water can be driven in the opposite directions also through the various openings in the toothbrush head portion 106 and handle portion 104.

Capsule Embodiments

Figure 11:
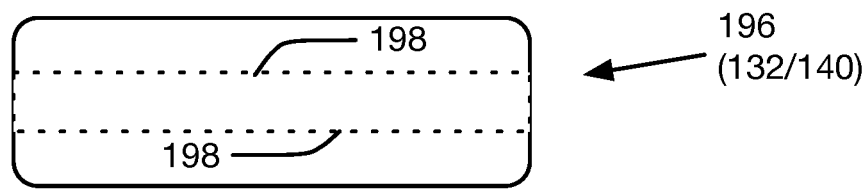
FIG. 11 is a plan view of a dentrifice capsule, in accordance with an embodiment of the present invention.

FIG. 11 shows an embodiment of a capsule 196 (e.g., stored capsule 132; loaded capsule 140) for use with the toothbrush 100. The capsule 196 is elongated and may be ellipsoidal or cylindrical so as to have rounded or flat ends. The capsule 196 is made of a material compatible with dentrifice and suitable for storing products to be used orally. For example, cellulose or other materials used in forming capsule for dietary supplements may be used. Thin plastic materials also may be used, since the capsule is not being ingested. In some embodiments the capsule 196 may have perforations to make breaking the capsule easier when the capsule is collapsed by the pressure applied between the rollers 156 and barrier portion 174. In the illustrated embodiment the capsule 196 includes have a pair of perforated lines 198, so as to allow a portion of the capsule to be peeled away prior to being loaded into the loading chamber 124 of the toothbrush 100. In such an embodiment, the dentrifice 150 is partially exposed prior to loading the capsule 196, thereby requiring less force to collapse the capsule and drive the dentrifice 150 through the opening 146 to the tooth cleaning elements 116.

Figure 12:
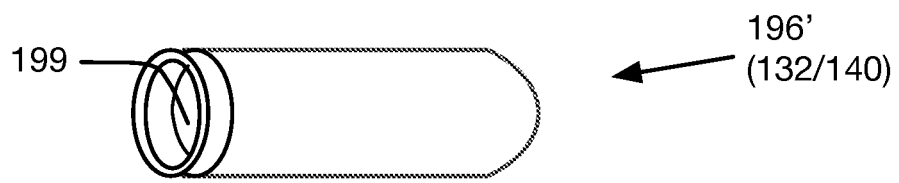
FIG. 12 is a plan view of a dentrifice capsule, in accordance with another embodiment of the present invention.

FIG. 12 shows another embodiment of a capsule 196' (e.g., stored capsule 132; loaded capsule 140) for use with the toothbrush 100. The capsule 196 is elongated and may be formed of the same materials as for the capsule 196 described above. However, the capsule 196' includes a thin foil or thin plastic covering 199 (e.g., membrane) at the distal end which may be more easily punctured by the barrier structure 174, and which may more easily move aside as the dentrifice 150 is forced from the capsule 196' hen the capsule 196' is being collapsed. In some embodiments the covering 199 has a different material composition than longitudinal walls of the single dose capsule 196'. In other embodiments the covering 199 has a different wall thickness than longitudinal walls of the single dose capsule 196'.

In other embodiment the capsule 140 has a uniform wall thickness and uniform wall material composition.

Shaving Brush Embodiment

Figure 13:
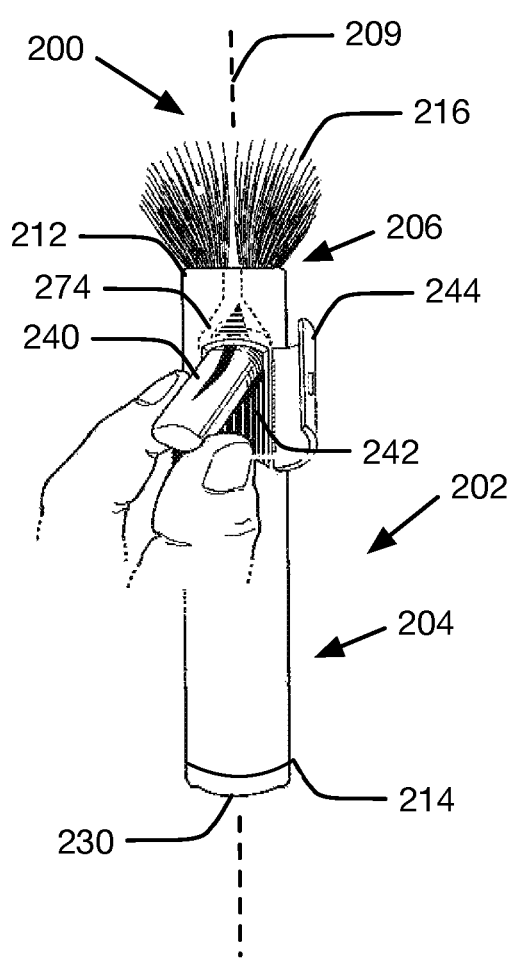
FIG. 13 is a perspective view of a shaving brush having a single dose dispensing capability, in accordance with an embodiment of the present invention.
Figure 14:
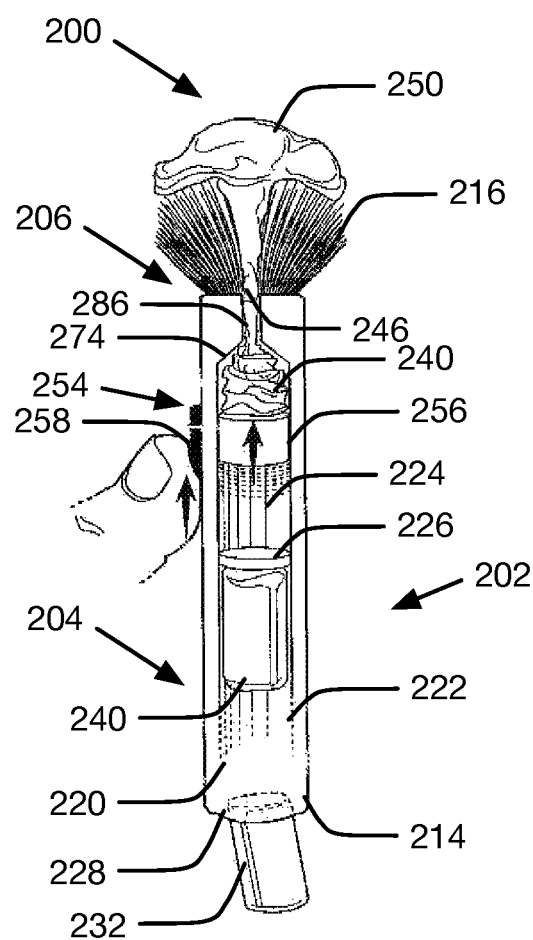
FIG. 14 is a exposed view of the shaving brush of FIG. 13 revealing the storage chamber and loading chamber therein, in accordance with an embodiment of the present invention.

Referring to FIGS. 13 and 14, a shave brush 200 is illustrated in accordance with an embodiment of the present invention. The shave brush 200 generally includes an elongated body 202 that extends along a longitudinal axis 209 from a proximal end 214 to a dismal end 212. A handle portion 204 is located toward the proximal end 214 and a head portion 206 is located toward the distal end 212. Brush elements 216 (e.g., bristles) extend from the head portion 206. The shave brush 200 is intended to be used in a manner that the brush elements 216 applying cream or shaving soap to a user's face.

In the exemplified embodiment, the elongated body 202 is formed of a rigid plastic material, for example polymers and copolymers of ethylene, propylene, butadiene, vinyl compounds and polyesters such as polyethylene terephthalate. In other embodiment, another material may be used, including horn, wood, acrylic, nylon, urethane, resin, glass, ceramic, or metal. Even materials such as ivory or shell may be used, although not preferred due to animal endangerment. The brush elements 216 may be formed by animal hair, such as boar hair, horse hair, badger bristle, or by a synthetic bristle material (e.g., nylon) that is pliable enough foreseen applying shaving substance (e.g., gel, foam, soap) to the user's face.

In an exemplary embodiment the shave brush 200 is hollow having an inner cavity 220 extending from an opening 228 at the proximal end 214 to a narrow channel 286 in the head portion 206 toward the distal end 212. In such embodiment the inner cavity 220 is divided into a storage chamber 222 and a loading chamber 224. A divider or barrier 226 is located in the cavity 220 to separate the storage chamber 222 from the loading chamber 224. The barrier 226 may be a separate piece inserted into the cavity 220, or may be an integral portion of the elongated body 202 or handle portion 204.

The storage chamber 222 serves to store a one or more single dose shaving cream capsules 232. The shaving cream capsule(s) 232 is inserted through the opening 228 into the chamber 222 for storage. The opening 228 is closed by a closing structure 230. Illustrated is a threaded plug that is screwed into the opening 228. The opening has a corresponding thread to receive the threaded plug. In other embodiments, the closing structure 230 may mate to the opening 228 without being threaded. The unthreaded plug may be made of an elastomer or other material configured for repeated insertion and removal. In still other embodiments the closing structure 130 may be a hinged door that clicks into and out of a locking position.

Figure 15:
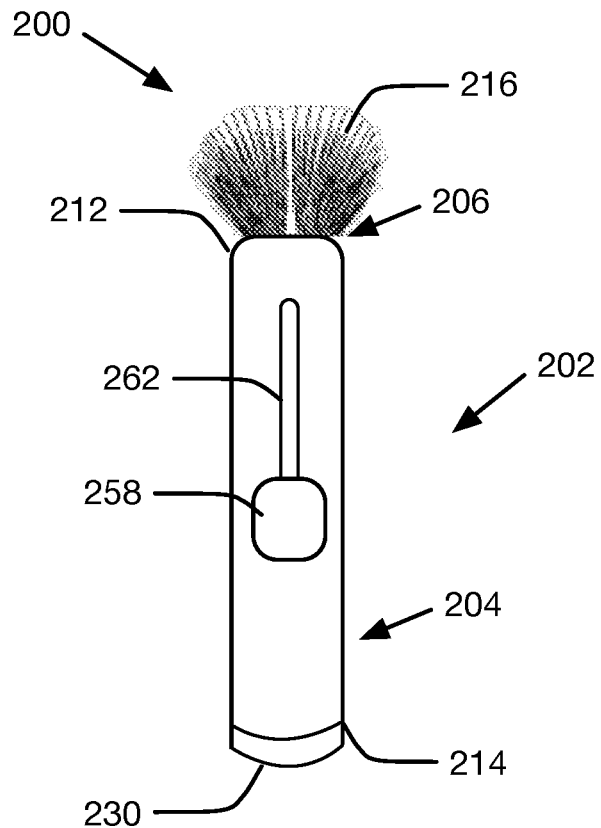
FIG. 15 is a perspective view from another side of a shaving brush of FIG. 13 having a single dose dispensing capability, in accordance with an embodiment of the present invention.

The loading chamber 224 is located more distal than the storage chamber 222 and extends from the handle portion 204 to the head portion 206. Along a sidewall of the handle portion 204 is an opening 242. The opening 242 is closed by a cover 244, such as a hinged door or a removable cover. A single shaving cream capsule 240 is inserted through the opening 242 into the loading chamber 224. The shaving capsule 240 is moved within the loading chamber 224 to a funneled barrier wall 274, then collapsed to release the shaving cream from within the capsule 240 into the channel 286. The head portion 206 includes an opening 246 at the distal end 212 among the brushing elements 216. When the capsule 240 is collapsed, the shaving cream 250 exits through the opening 246 to the brushing elements 216. (See FIG. 15.)

Referring to FIG. 14, a longitudinal cross section of the shave brush 200 is illustrated revealing the inner channel 222 and internal structures. In an exemplary embodiment, the shave brush 200 includes an advancing mechanism 254 that moves the loaded capsule 240 within the loading chamber 124 to a more distal portion of the loading chamber 224. The advancing mechanism 254 corresponds to the previously described piston embodiment 154' of the toothbrush, adapted to the size of the inner channel 220 of the shave brush 200. The advancing mechanism 254 includes a piston 256 and a slider grip 258. The slider grip 258 is coupled to piston 156 to move the entire advancing mechanism 254 longitudinally within the loading chamber 224. A user places their finger on the slider grip 258 and pushes the slider grip 258 along a track 262 (see FIG. 15) to advance the advancing mechanism 254 longitudinally. In the illustrated embodiment, the piston 256 and slider grip 258 have the same longitudinal position relative to each other, rather than have the piston 256 be more distally offset as in the toothbrush embodiments. In other embodiments the piston 256 be more distally offset than the slider grip 258, as in the advancing mechanism 154 shown in FIGS. 5A and 5B. The piston 256 has an outer dimension that generally conforms to a cross section of the inner channel 220 so as to prevent shaving substance 250 from passing proximally beyond the piston 256 when the single dose capsule 240 is collapsed between the piston 256 and the funneled barrier wall 274.

Figure 16:
FIG. 16 is a plan view of a shaving substance capsule, in accordance with an embodiment of the present invention.

FIG. 16 shows an embodiment of a capsule 296 (e.g., stored capsule 232; loaded capsule 240) for use with the shave brush 200. The capsule 296 is elongated and may be ellipsoidal or cylindrical so as to have rounded or flat ends. In the illustrated embodiment, one end of the capsule 296 is cone-shaped, so as to generally conform to the shape of the funneled barrier wall 274. The capsule 196 is made of a material compatible with the shaving substance being stored within the capsule. For example, cellulose or other materials used in forming capsule for dietary supplements may be used. Although other materials, such as a thin plastic materials may be used, since the capsule is not being ingested. In some embodiments the capsule 296 may have perforations to make breaking the capsule easier when the capsule is collapsed by the pressure applied between the piston 256 and the funneled barrier wall 274. In the illustrated embodiment the capsule 296 includes have a pair of perforated lines 298 at the conical end 297, so as to allow a portion of the capsule 296 to be peeled away prior to being loaded into the loading chamber 224 of the shave brush 100. In such an embodiment, the shaving substance 250 is partially exposed prior to loading the capsule 296, thereby requiring less force to collapse the capsule and drive the shaving substance 250 through the opening 246 to the brush elements 216.

Figure 17:
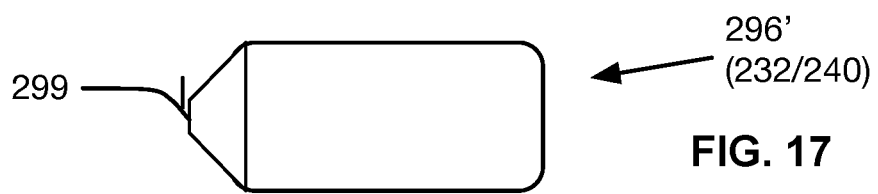
FIG. 17 is a plan view of a shaving substance, in accordance with another embodiment of the present invention.

FIG. 17 shows another embodiment of a capsule 296' (e.g., stored capsule 232; loaded capsule 240) for use with the shave brush 200. The capsule 296' is elongated and may be formed of the same materials as for the capsule 296 described above. However, the capsule 296' includes a thin foil or thin plastic covering 299 at the distal end which may be split open and break more easily when the capsule 240 is compressed against the funneled barrier wall 274 by the piston 256 under the force applied by the user through the slider grip 258. As a result, the shaving substance 150 is directed more easily to and through the channel 286 to exit the opening 246 to the brush elements 216. Further, for such an embodiment, a shaving foam may be packaged as the shaving substance 250 under pressure, and expand through the channel 286 when the foil is broken open under the applied pressure transmitted from the user through the slider grip 258 and piston 256. As the capsule is collapsed more of the shaving foam is forced out the opening 246. Exemplary embodiments of the shaving substance 250 include at least shaving cream, shaving soap, and shaving gel.

In other embodiment the capsule 140 has a uniform wall thickness and uniform wall material composition.

The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A personal care applicator brush for applying a personal care substance from a single-dose capsule to a body part of a user, comprising:
   a brush head face from which brush elements extend, the brush head face having a first opening;
   an elongated body extending longitudinally from a proximal end to a distal end and having an inner channel extending to the first opening in the brush head face;
   a loading chamber for receiving the single-dose capsule through a second opening in said elongated body, said loading chamber being a portion of the inner channel;
   an advancing member comprising a slider external to the elongated body, a channel member located within the inner channel, and a frame connecting the slider to the channel member, the frame including a rail portion which is movable along a track opening in the elongated body so that the advancing member is moved longitudinally relative to the elongated body; and
   a barrier in the inner channel in a pathway along which the single-dose capsule moves when the advancing member is moved distally while the loading chamber is loaded with said single-dose capsule,
   wherein the advancing member, the barrier and the track opening are configured so that a longitudinal distance between the barrier and the channel member is shorter than length of the single dose capsule when the advancing member advances to a most distal position relative to the track opening so as to collapse the single-dose capsule between the barrier and the channel member and discharge the personal care substance within the single-dose capsule through the first opening in the brush head face to the brush elements.

2. The personal care applicator brush of claim 1, further comprising a storage chamber for storing multiple single-dose capsules of shaving substance, said storage chamber being located in said elongated body and being a portion of the inner channel.

3. The toothbrush of claim 1, further comprising the single dose capsule, the single dose capsule having perforations for facilitating opening of the single dose capsule.

4. The toothbrush of claim 1, further comprising the single dose capsule, the single dose capsule having a distal end with a membrane configured to tear when pressed against the barrier, the membrane having either one or both of a different material composition or a different thickness than longitudinal walls of the single dose capsule.

5. The personal care applicator brush of claim 1 as a shave brush, in which the personal care product is shaving substance.

6. The personal care applicator brush of claim 5, in which the barrier is formed by walls of a narrowed portion of the inner channel in a funnel configuration for guiding the shaving substance from the single-dose capsule into and through the first opening in the brush head face to the brush elements.

7. The personal care applicator brush of claim 1 as a toothbrush and in which the personal care product is dentifrice for being applied orally to teeth.

8. The toothbrush of claim 7, in which the barrier comprises a slider portion, a barrier portion, and a rail portion.

9. The toothbrush of claim 7, in which the barrier comprises a protrusion extending in a proximal direction, the protrusion being configured to puncture the single dose capsule.

10. A toothbrush for applying dentrifice from a single-dose capsule to teeth of a user, comprising:
    a brush head having a brush head face from which brush elements extend, the brush head face having a first opening;
    an elongated body comprising a handle portion and a brush head portion, the elongated body extending longitudinally from a proximal end to a distal end and having an inner channel extending to the first opening in the brush head face;

a loading chamber for receiving the single-dose capsule through a second opening in said elongated body, said loading chamber being a portion of the inner channel;

an advancing member comprising a slider external to the elongated body, a channel member located within the inner channel, and a frame connecting the slider to the channel member, the frame including a rail portion which is movable along a track opening in the elongated body so that the advancing member is moved longitudinally relative to the elongated body; and a barrier in the inner channel in a pathway along which the single-dose capsule moves when the advancing member is moved distally while the loading chamber is loaded with said single-dose capsule, wherein the advancing member, the barrier and the track opening are configured so that a longitudinal distance between the barrier and the channel member is shorter than length of the single dose capsule when the advancing member advances to a most distal position relative to the track opening so as to collapse the single-dose capsule between the barrier and the channel member and discharge the dentrifice within the single-dose capsule through the first opening in the brush head face to the brush elements.

11. The toothbrush of claim 10, further comprising a storage chamber located proximal to the loading chamber, the storage chamber being a portion of the inner channel, the inner channel extending between the first opening in the brush head face and a second opening toward the proximal end, a separator being in the inner channel dividing the loading chamber and the storage chamber, the storage chamber and the second opening being configured for receiving one or more single dose capsules to be stored in the storage chamber.

12. The toothbrush of claim 10, in which the elongated body includes a loading chamber opening along a sidewall configured to receive a single dose capsule into the loading chamber.

13. The toothbrush of claim 10, in which the channel member comprises a roller coupled to the frame, the roller facilitating longitudinal movement of the advancing member.

14. The toothbrush of claim 10, in which the channel member comprises a piston coupled to the frame, the piston conforming to walls of the inner channel so as to prevent dentrifice from passing proximally beyond the advancing member when the single dose capsule is collapsed between the piston and the barrier.

15. The toothbrush of claim 10, in which the barrier comprises a slider portion, a barrier portion, and a rail portion, and in which the toothbrush head portion comprises a second track opening leading to the inner channel and along which the rail portion is movable with the barrier in a longitudinal direction.

16. The toothbrush of claim 10, in which the barrier portion of the barrier comprises a protrusion extending in a proximal direction, the protrusion being configured to puncture the single dose capsule when a distance between the protrusion and the channel member is decreased to be less than length of the single dose capsule.

17. The toothbrush of claim 10, in which the brush head portion comprises the first opening to the brush elements, a second track opening for the barrier, and a third opening, the third opening having a covering and being to open to outside the toothbrush when the cover exposes the third opening.

18. The toothbrush of claim 10, further comprising the single dose capsule, the single dose capsule having perforations for facilitating opening of the single dose capsule.

19. The toothbrush of claim 10, further comprising the single dose capsule, the single dose capsule having a distal end with a membrane configured to tear when pressed against the barrier, the membrane having either one or both of a different material composition or a different thickness than longitudinal walls of the single dose capsule.

\* \* \* \* \*